United States Patent
Ujifusa

(10) Patent No.: US 6,802,291 B2
(45) Date of Patent: Oct. 12, 2004

(54) AUTOMATIC ENGINE STOP AND RESTART SYSTEM FOR VEHICLES AND METHOD THEREFOR

(75) Inventor: Takayuki Ujifusa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 55 days.

(21) Appl. No.: 10/270,602

(22) Filed: Oct. 16, 2002

(65) Prior Publication Data

US 2003/0089326 A1 May 15, 2003

(30) Foreign Application Priority Data

Nov. 9, 2001 (JP) ........................................ 2001-344076

(51) Int. Cl.[7] .............................................. F02N 17/00
(52) U.S. Cl. ..................... 123/179.4; 701/112
(58) Field of Search .................... 123/179.4, 179.3; 701/112

(56) References Cited

U.S. PATENT DOCUMENTS 4,494,497 A * 1/1985 Uchida et al. ........... 123/179.4

2003/0041830 A1 * 3/2003 Sugiura et al. .......... 123/179.4

FOREIGN PATENT DOCUMENTS

| JP | 2001-55941 A | 2/2001 |
| WO | WO01/71181 A2 * | 9/2001 |

* cited by examiner

Primary Examiner—Mahmoud Gimie
Assistant Examiner—Arnold Castro
(74) Attorney, Agent, or Firm—Foley & Lardner LLP

(57) ABSTRACT

An automatic engine stop and restart system for a vehicle is provided which comprises a controller for controlling an automatic stop and restart of an engine in accordance with a driving condition of the vehicle. The controller includes a control section for automatically restarting the engine when an engine speed is lowered so as to be equal to or lower than a predetermined engine speed under a condition that a vehicle main switch is ON and predetermined automatic engine stop conditions are not satisfied, and a control section for inhibiting an automatic restart of the engine before a first manual engine start after the vehicle main switch has been ON is completed. A method for controlling automatic engine stop and restart in accordance with a driving condition of a vehicle is also provided.

19 Claims, 2 Drawing Sheets

US 6,802,291 B2

AUTOMATIC ENGINE STOP AND RESTART SYSTEM FOR VEHICLES AND METHOD THEREFOR

BACKGROUND OF THE INVENTION

The present invention relates to an automatic engine stop and restart system for vehicles, and in particular to an automatic engine stop and restart system that executes an automatic engine stop that is so-called an idle stop when predetermined conditions such as continuous stoppage of a vehicle are satisfied and an automatic engine restart when conditions for restarting the engine are satisfied. The present invention further relates to a method for controlling an automatic engine stop and restart.

An automatic engine stop and restart system has been proposed that automatically stops an engine during stoppage of a vehicle and thereafter automatically restarts the engine at start of a vehicle for the purpose of, for example, preventing emission of an exhaust gas during stoppage of the vehicle at a crossing in the street.

The so-called idle stop technique is widely used in hybrid vehicles that use jointly an engine and an electric motor as a power source for driving the vehicles. In such vehicles, various idle stop techniques such as a technique for stopping an engine and driving a vehicle only by an electric motor at particularly low-speed running of the vehicle and automatically restarting the engine when the vehicle speed reaches a predetermined value, are utilized.

Further, Japanese Patent Provisional Publication No. 2001-55941 discloses an automatic engine stop and restart system that automatically restarts the engine even when stoppage of the engine that is not due to an automatic engine stop control, i.e., engine stall due to an erroneous operation of the engine or due to excessively rapid braking by a driver is caused, similarly after an automatic engine stop control, by determining whether conditions of an automatic engine restart are satisfied. Specifically, in case stoppage of the engine that is not due to the automatic engine stop control is caused, the engine is restarted by operating a starter motor or a corresponding motor generator, while performing a predetermined operation such as depression of the clutch pedal or release of depression on the brake pedal.

SUMMARY OF THE INVENTION

However, the automatic engine stop and restart system disclosed in the above described publication is adapted to automatically restart the engine when the engine speed is zero and predetermined conditions (e.g., depression of the clutch pedal) are satisfied and to detect entirely nothing about whether a manual starting operation is performed by a driver at the start of driving of the vehicle. Accordingly, there can occur such a case in which the engine is automatically started unexpectedly if, for example, predetermined conditions are satisfied when the driver gets on the vehicle and turns the ignition key switch ON but has not yet executed a manual starting operation (e.g., cranking by turning the ignition key switch into the start position), thus causing a problem that the driver has a strange feeling.

Further, the system of the above-described publication executes an automatic engine restart with the condition that the engine speed is zero. Thus, in case of engine stall that is not intended by the driver, the engine is always stopped once completely and immediately thereafter cranking is started to automatically restart the engine. Accordingly, the driver also has a strange feeling at the time of engine stall.

It is accordingly an object of the present invention to provide an automatic engine stop and restart system for a vehicle that is free from the above noted problems inherent in the prior art system.

It is another object of the present invention to provide a method for controlling an automatic engine stop and restart that is of the foregoing character.

To accomplish the above object, there is provided according to an aspect of the present invention an automatic engine stop and restart system for a vehicle comprising a controller for controlling an automatic stop and restart of an engine in accordance with a driving condition of the vehicle, the controller including a control section for automatically restarting the engine when an engine speed is lowered so as to be equal to or lower than a predetermined engine speed under a condition that a vehicle main switch is ON and predetermined automatic engine stop conditions are not satisfied, and a control section for inhibiting the automatic restart of the engine before a first manual engine start after the vehicle main switch has been ON is completed.

According to another aspect of the present invention, there is provided an automatic engine stop and restart system for a vehicle comprising means for automatically restarting the engine when an engine speed is lowered so as to be equal to or lower than a predetermined engine speed under a condition that a vehicle main switch is ON and predetermined automatic engine stop conditions are not satisfied, and means for inhibiting an automatic restart of the engine before a first manual engine start after the vehicle main switch has been ON is completed.

According to another aspect of the present invention, there is provided a method for controlling an automatic stop and restart of an engine in accordance with a driving condition of a vehicle, comprising automatically restarting the engine when an engine speed is lowered so as to be equal to or lower than a predetermined engine speed under a condition that a vehicle main switch is ON and predetermined automatic engine stop conditions are not satisfied, and inhibiting the automatic restart of the engine before a first manual engine start after the vehicle main switch has been ON is completed.

DESCRIPTION OF THE PREFERRED EMBODIMENT

Figure 1:
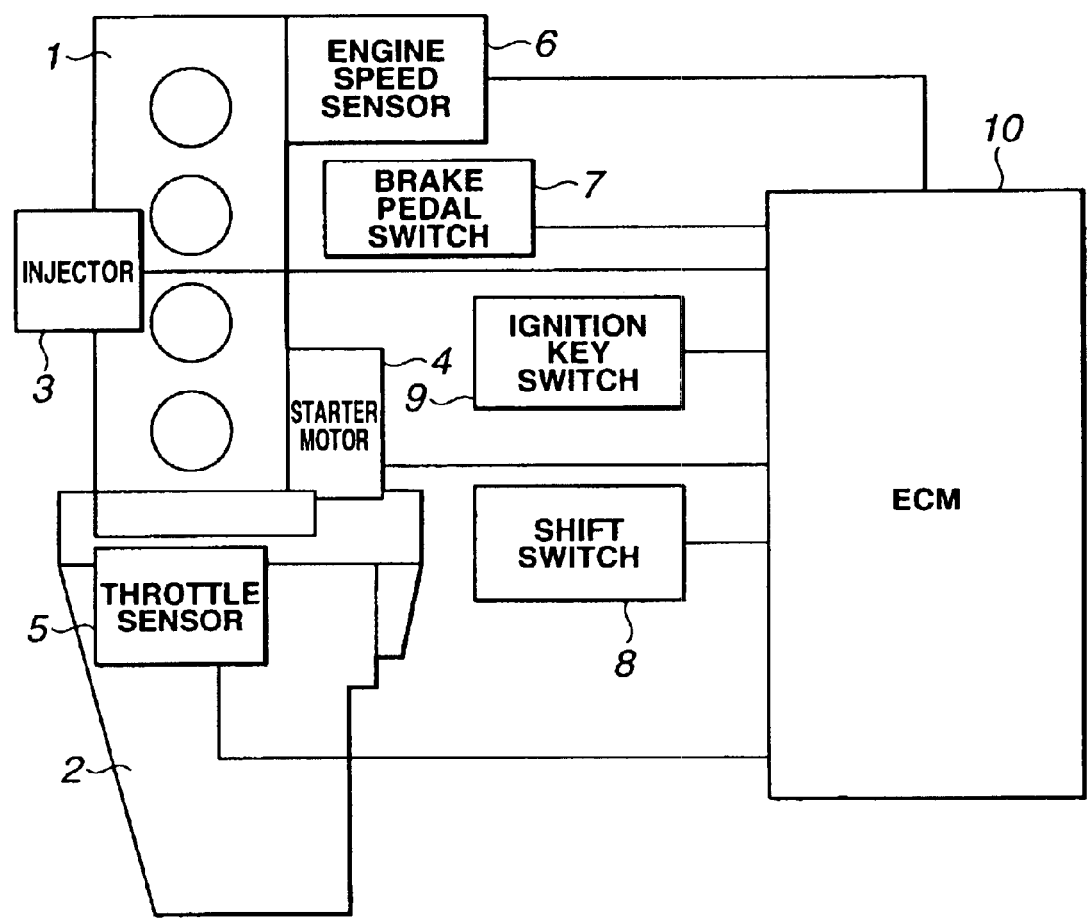
FIG. 1 is a block diagram of an automatic engine stop and restart system according to an embodiment of the present invention.

FIG. 1 shows an automatic engine stop and restart system according to an embodiment of the present invention. In FIG. 1, an engine consisting of, for example, a gasoline engine is indicated by 1 and drivingly connected to driven road wheels (not shown) by way of automatic transmission 2. Engine 1 includes injector 3 for injection of fuel and spark plugs (not shown). Starter 4 is provided for cranking engine 1 by way of a ring gear (not shown).

Further, in this embodiment, there are provided a plurality of sensors for detecting an operating condition of a vehicle. For example, there are provided sensors such as throttle sensor 5 for detecting an opening degree of a throttle valve (not shown) of engine 1, engine speed sensor 6 for detecting an engine speed, brake pedal switch 7 for detecting a depressed condition of a brake pedal (not shown), and shift switch 8 for detecting a shift position of automatic transmission 2. Detection signals from those sensors are supplied to engine control module (ECM) 10 for executing a control of overall engine 1, including an automatic stop and restart control of engine 1. Further, there is provided a vehicle main switch such as ignition key switch 9 adjacent a driver's seat. Ignition key switch 9 has operative positions including an OFF position, an accessory (ACC) position for allowing audio systems, a lighting apparatus, etc. to be operable, an ignition (IGN) position corresponding to an ON position of the vehicle main switch, and a start (ST) position for cranking engine 1 by means of starter motor 4. In the meantime, while engine control module 10 is always in a turned-ON condition irrespective of the position of ignition key switch 9, it starts executing a control when a key (not shown) is inserted into a key slot (not shown) of ignition key switch 9 and turned so as to bring ignition key switch 9 into the ignition position by way of the accessory position.

Figure 2:
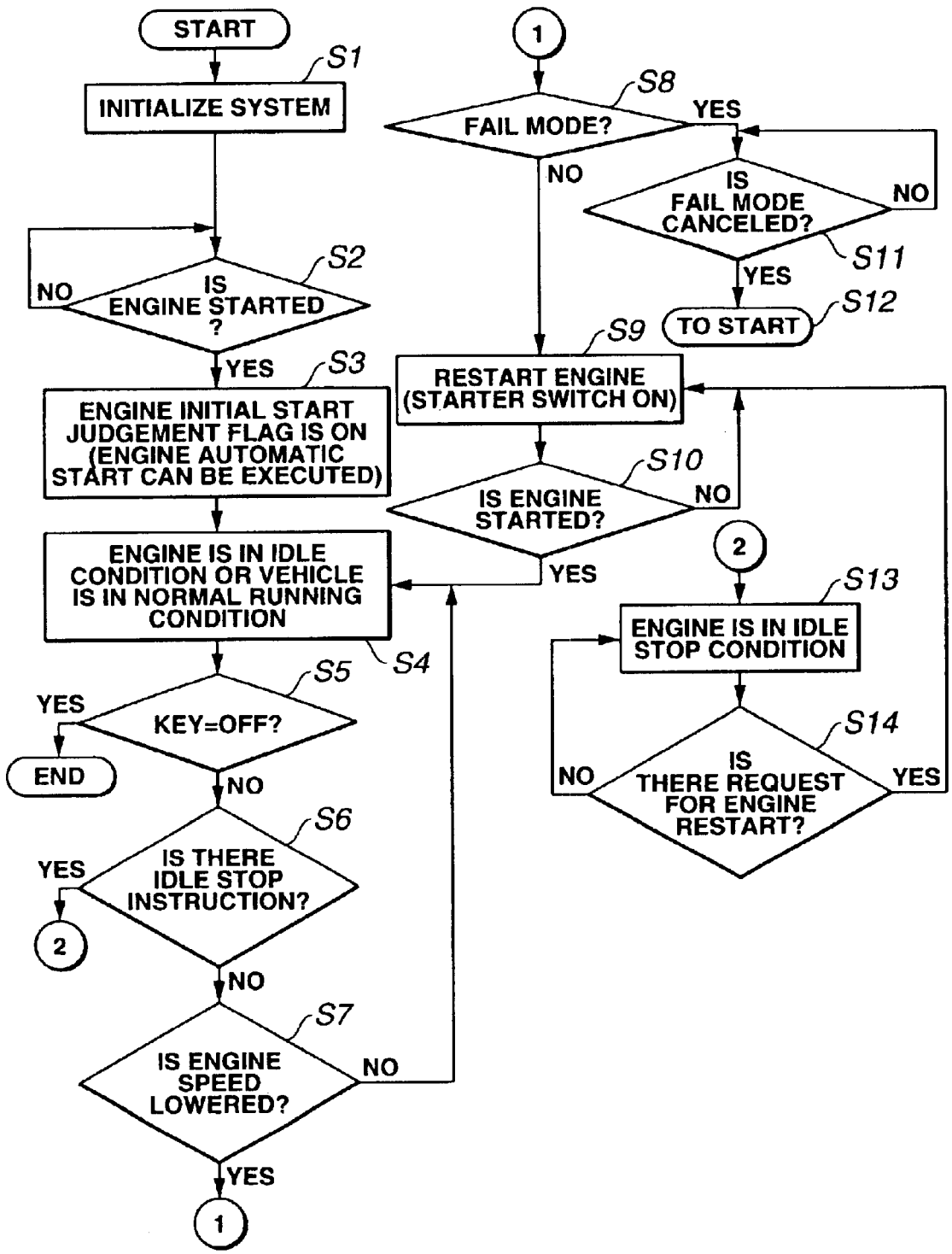
FIG. 2 is a flowchart showing an idle stop control executed by the automatic engine stop and restart system of FIG. 1.

FIG. 2 is a flowchart showing a control, particularly an idle stop control for automatically stopping and restarting engine 10, that is executed in engine control module 10 according to the present invention.

Firstly, ignition key switch 9 is turned into the ignition position to start the control. By this, an idle stop control system is initialized (step S1) and an engine initial start determination flag is set OFF. Then, the program proceeds to step S2 where it is determined whether engine 1 has been started, specifically, whether a condition of engine 1 at self-operable engine speed (e.g., at 550 rpm or more) has continued for a predetermined time (e.g., 0.5 seconds or more).

Generally, at start of driving of the vehicle, the driver performs the following actions. First, the driver turns ignition key switch 9 into the ignition position and then into the start position to execute a manual start by cranking engine 1 by means of starter motor 4. Thereafter, when it is recognized that engine 1 has been started to perform a self-operation, the driver turns ignition key switch 9 into the ignition position to finish cranking.

Accordingly, at the time when the driver has finished cranking, the determination at step S2 has generally become affirmative, and the program proceeds to step S3 where the engine initial start determination flag is set ON. By this, it is indicated that an initial manual start has been completed. In the meantime, in this embodiment, ignition key switch 9 having been placed in the start position does not cause any variation of the engine initial start determination flag. Accordingly, even if cranking is repeated a plurality of times, the engine initial start determination flag is held OFF until start of engine 1 is completed.

In this manner, after the initial start is completed, the program proceeds to step S4 where engine 1 is in an idle condition or the vehicle is in a normal running condition. Then, the program proceeds to step S5 where it is determined whether ignition key switch 9 is OFF. If ignition key switch 9 is OFF, the control is ended and engine 1 is stopped. In step S6, it is determined whether there is an idle stop instruction. Output of the idle stop instruction is processed by another control routine that is not shown, for example, the condition where the vehicle speed is zero and the brake pedal is depressed is regarded as stoppage of the vehicle at a crossing in the street or the like and the idle stop instruction is outputted. If there is the idle stop instruction (i.e., the answer in stop S6 is affirmative), the program proceeds to step S13 that is described later. Further, in step S7, it is determined whether engine stall that is not intended by the driver is caused, specifically, it is determined whether the engine speed is lowered so as to be incapable of operating by itself, i.e., so as to become equal to or less than 300 rpm. If it is determined in step S7 that engine stall that is not intended by the driver is caused, the program proceeds to step S8.

If all the answers in steps S5 to S7 are negative, step S4 is repeated and the engine idle condition or the normal vehicle running condition is continued.

If it is determined in step S6 that there is the idle stop instruction (i.e., the answer in step S6 is affirmative), the program proceeds to step S13 where engine 1 is automatically stopped and put in an idle stop condition. Then, the program proceeds to step S14 where it is repeatedly determined whether there is a request for restarting engine 1. Output of an engine restart request is processed in another control routine, e.g., it is determined whether to restart engine 1 based on some conditions such as release of the brake pedal and depression of an accelerator pedal (not shown). When the request for restart of engine 1 is outputted, the program proceeds from step S14 to step S9 where engine 1 is automatically restarted. Specifically, a starter switch (not shown) is switched ON to start starter motor 4 thereby cranking engine 1. Then, the program proceeds to step S10 where it is determined whether engine 1 has been started. The determination on start of engine 1 can be made, for example similarly to step S2, based on whether self-operable engine speed, i.e., engine speed equal to or higher than 550 rpm has continued for 0.5 seconds or more. In this connection, the program returns to step S9 to continue cranking until it is determined that engine 1 has been started. Further, after start of engine 1, the program returns to step S4 so that engine 1 is put in an idle condition or the vehicle is put in a normal running condition. In this manner, typically, engine 1 is automatically stopped when the vehicle stops at a crossing in the street or the like and automatically restarted at start of the vehicle.

On the other hand, if it is determined in step S7 that engine stall that was not intended by the driver was caused, the program proceeds to step S8 where it is determined whether the system is in a fail mode, i.e., whether it is determined whether engine stall has resulted from forced stoppage of engine 1 due to the fail mode. Engine control module 10 monitors the whole control systems of engine 1 at all times so as to determine whether there is caused something abnormal, e.g., if it is determined that there has been caused something abnormal such as extraordinary rise of the water temperature, extraordinary rise of the oil temperature and some sensor trouble, engine control module 10 causes the control mode of the whole control systems to be transferred to a predetermined fail mode and may forcedly stop engine 1 depending upon the kind of abnormality. In such a case, it is not desirable to automatically restart engine 1. Thus, the program proceeds to step S11 to wait for the fail mode to be canceled. In the meantime, under this condition, it is also desirable to make it impossible to attain even manual restart of engine 1 by ignition key switch 9. In case the fail mode is caused by extraordinary rise of the water temperature or the oil temperature, the lapse of time may cause the fail mode to be canceled and the control mode to return to a normal mode. Thus, when the fail mode is canceled, the program returns from step S12 to the start of the program. Accordingly, the engine initial start determination flag is set OFF, and as mentioned before, an automatic restart is inhibited until a manual start by ignition key switch 9 is completed.

If it is determined in step S8 that the system is not in the fail mode, engine stall due to rapid braking or due to engine 1 out of order will be caused, so that the program proceeds to step S9 where similarly to the above described return from the idle stop condition, cranking by starter motor 4 is performed to automatically restart engine 1.

In this embodiment, an automatic stop and restart of engine 1 by the idle stop control is performed in this manner, while at the same time an automatic restart is executed even when engine stall that is not intended by the driver and irrespective of the idle stop instruction is caused. Thus, the automatic engine stop and restart system of this invention makes it unnecessary to perform the manual restart operation at such unintended engine stall and therefore has a good operation ability and a good usefulness. Further, since cranking by starter motor 4 is started before engine 1 is stopped completely, complete stoppage of engine 1 can be avoided and therefore the driver feels slight decrease of engine speed only so that deterioration of the drivability and a strange feeling of the driver due to stoppage of engine 1 can be avoided.

Further, since an automatic start never occurs unless the driver manually operates ignition key switch 9 to start engine 1 at start of driving of the vehicle, there never occurs such a case that automatic start is caused suddenly to make the driver have a strange feeling.

The entire contents of Japanese Patent Application P2001-344076 (filed Nov. 9, 2001) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while in the embodiment described and shown as above the engine initial start determination flag is initialized and set OFF at start of the control, it can be set OFF when ignition key switch 9 is turned OFF to finish the control. Further, while the present invention has been described and shown as being applied to a vehicle that is driven by engine 1 only, it can be applied to a hybrid vehicle that is driven by an engine and an electric motor. In this connection, various hybrid vehicles are known in the art. For example, there are known such one adapted to execute both of an initial start and restart by a starter motor, another one adapted to carry out only an initial start by a starter motor and a restart by cranking the engine by means of a motor generator that also serves as a dynamo, and further one that is not equipped with a starter motor and adapted to execute both of an initial start and restart by a motor generator. The present invention can by applied to either of those hybrid vehicles.

The scope of the invention is defined with reference to the following claims.

What is claimed is:

1. An automatic engine stop and restart system for a vehicle comprising:
    a controller for controlling an automatic stop and restart of an engine in accordance with a driving condition of the vehicle;
    the controller including:
    a control section for automatically restarting the engine when an engine speed is lowered so as to be equal to or lower than a predetermined engine speed under a condition that a vehicle main switch is ON and predetermined automatic engine stop conditions are not satisfied; and
    a control section for inhibiting the automatic restart of the engine before a first manual engine start after the vehicle main switch has been ON is completed.

2. An automatic engine stop and restart system according to claim 1, wherein the predetermined engine speed is an engine speed at which the engine is incapable of operating by itself.

3. An automatic engine stop and restart system according to claim 1, wherein the controller further comprises a control section for inhibiting the automatic restart in regard to lowering of the engine speed that is irrespective of the automatic stop when the engine has been forcedly stopped due to occurrence of a system failure.

4. An automatic engine stop and start system according to claim 1, wherein the controller further comprises a control section for providing an engine initial start determination flag that changes from OFF to ON when the first manual engine start is completed, a control section for permitting the automatic restart when the engine speed becomes equal to or lower than the predetermined engine speed irrespective of the automatic stop and the initial start determination flag is ON, and a control section for inhibiting the automatic restart when the initial start determination flag is OFF.

5. An automatic engine stop and restart system according to claim 4, wherein the controller comprises a control section for determining that the first manual start is completed when the engine speed reaches a predetermined engine speed during the time the initial start determination flag is OFF.

6. The automatic engine stop and restart system according to claim 1, wherein completing the first manual engine start includes moving the vehicle main switch to a start position for cranking the engine.

7. The automatic engine stop and restart system according to claim 1, wherein the vehicle main switch includes an ignition key switch.

8. The automatic engine stop and restart system according to claim 7, wherein the ignition key switch includes an OFF position, an accessory position for allowing accessory systems of the vehicle to operate, an ignition position, and a start position for cranking the engine, and wherein the vehicle main switch is ON when the ignition key switch is in the ignition position.

9. The automatic engine stop and restart system according to claim 8, wherein completing the first manual engine start includes moving the ignition key switch from the ignition position to the start position.

10. An automatic engine stop and restart system for a vehicle comprising:
    means for automatically restarting the engine when an engine speed is lowered so as to be equal to or lower than a predetermined engine speed under a condition that a vehicle main switch is ON and predetermined automatic engine stop conditions are not satisfied; and
    means for inhibiting an automatic restart of the engine before a first manual engine start after the vehicle main switch has been ON is completed.

11. The automatic engine stop and restart system according to claim 10, wherein completing the first manual engine start includes moving the vehicle main switch to a start position for cranking the engine.

12. The automatic engine stop and restart system according to claim 10, wherein the vehicle main switch includes an ignition key switch having an OFF position, an accessory position for allowing accessory systems of the vehicle to operate, an ignition position, and a start position for cranking the engine, and wherein the vehicle main switch is ON when the ignition key switch is in the ignition position.

13. A method for controlling an automatic stop and restart of an engine in accordance with a driving condition of a vehicle, comprising;

automatically restarting the engine when an engine speed is lowered so as to be equal to or lower than a predetermined engine speed under a condition that a vehicle main switch is ON and predetermined automatic engine stop conditions are not satisfied; and inhibiting the automatic restart of the engine before a first manual engine start after the vehicle main switch has been ON is completed.

14. The method for controlling an automatic stop and restart of an engine according to claim 13, wherein completing the first manual engine start includes moving the vehicle main switch to a start position for cranking the engine.

15. The method for controlling an automatic stop and restart of an engine according to claim 13, wherein the vehicle main switch includes an ignition key switch having an OFF position, an accessory position for allowing accessory systems of the vehicle to operate, an ignition position, and a start position for cranking the engine, and wherein the vehicle main switch is ON when the ignition key switch is in the ignition position.

16. A method according to claim 13, wherein the predetermined engine speed is an engine speed at which the engine is incapable of operating by itself.

17. A method according to claim 13, further comprising inhibiting the automatic restart in regard to lowering of the engine speed that is irrespective of the automatic stop when the engine has been forcedly stopped due to occurrence of a system failure.

18. A method according to claim 13, further comprising providing an engine initial start determination flag that changes from OFF to ON when the first manual engine start is completed, permitting the automatic restart when the engine speed becomes equal to or lower than the predetermined engine speed irrespective of the automatic stop and the initial start determination flag is ON, and inhibiting the automatic rest&t when the initial start determination flag is OFF.

19. A method according to claim 18, further comprising determining that the first manual start is completed when the engine speed reaches a predetermined value during the time the initial start determination flag is OFF.

\* \* \* \* \*